US006335868B1

(12) United States Patent
Butterbaugh et al.

(10) Patent No.: US 6,335,868 B1
(45) Date of Patent: Jan. 1, 2002

(54) ENHANCED ENCLOSURE ARRANGEMENT FOR A COMPUTER

(75) Inventors: Matthew Allen Butterbaugh, Rochester; Max John Christopher Koschmeder, Oronoco; William Michael Monson, Rochester; Gary Allen Thompson, Pine Island; Brian Joseph Stanczyk; Wesley H. Bachman, both of Rochester; Michael Scott Good, Byron; Kevin Robert Qualters, Rochester; Raymond Floyd Babcock, Stewartville; Todd Douglas Green, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/499,470

(22) Filed: Feb. 7, 2000

(51) Int. Cl.⁷ .............................. H05K 5/00; H05K 7/14
(52) U.S. Cl. ..................... 361/796; 361/727; 361/753; 361/801; 361/802; 361/804; 312/223.2; 220/4.02
(58) Field of Search ................... 361/683, 686, 361/724–727, 752, 753, 796, 797, 800–802, 803, 816, 818; 312/223.1–223.3, 298; 206/706, 719; 220/4.02

(56) References Cited

U.S. PATENT DOCUMENTS

| | | | | |
|---|---|---|---|---|
| 3,289,047 A | * | 11/1966 | Pick ........................... | 361/724 |
| 5,031,075 A | * | 7/1991 | Casanova et al. ........... | 361/802 |
| 5,460,441 A | * | 10/1995 | Hastings et al. ............ | 312/298 |
| 5,469,037 A | * | 11/1995 | McMurtrey, Sr. et al. .. | 318/626 |
| 5,708,563 A | * | 1/1998 | Carnston, III et al. ...... | 361/683 |
| 5,816,673 A | * | 10/1998 | Sauer et al. ............. | 312/223.2 |

* cited by examiner

Primary Examiner—Jayprakash N. Gandhi
(74) Attorney, Agent, or Firm—Robert H. Berdo, Jr.

(57) ABSTRACT

An enclosure arrangement includes a chassis, and a central electronics complex. The central electronics complex has a cage removably positioned within the chassis. The cage has an open top providing access into the interior of the cage. The central electronics complex also includes a backplane arranged in a horizontal position, and forming a floor of the cage. The backplane has at least one card slot on a surface thereof. The central electronics complex further includes at least one circuit board disposed in the interior of the cage and being removably received by the card slot. The circuit board is arranged in a vertical position so that a gravitational force helps retain the circuit board in the card slot. The cage is removably positioned within the chassis. At least one rail connects the cage to the chassis. The cage is disposed on the rail, and is guidable into the chassis using the rail.

29 Claims, 8 Drawing Sheets

ENHANCED ENCLOSURE ARRANGEMENT FOR A COMPUTER

BACKGROUND OF THE INVENTION

1. Field of the Invention

The invention relates to an enhanced enclosure arrangement for a computer, such as a deskside personal computer, and in particular, to an enhanced enclosure arrangement that accommodates therein a backplane, processor cards, input/output cards, memory riser cards, cooling devices and a power supply, for example.

2. Background Information

Computer systems typically have internal components that are disposed within a cage. For example, it is known to place an assembly, including a backplane and various circuit boards, such as a processor card, an input-output card and a so-called memory riser card, within an open cage. This forms a so-called central electronics complex (CEC) of a computer system. The cage is subsequently fixed within a computer housing.

The cage serves to position the circuit boards within the computer housing, and acts as an EMC (electromagnetic compatible) shield. An EMC shield allows operation in an electromagnetic environment at an optimal level of efficiency, and allows static charges to be drained to a frame ground. Moreover, the cage helps to protect the components contained therein from environmental damage, for example, vibrations, which could cause the components to fail.

Conventionally, the backplane, which is wiring board, is typically provided with card slots for the various circuit boards. The respective circuit boards may be removably coupled to the backplane by inserting a corresponding plug connector on the circuit board into the associated backplane card slot. The circuit boards are then held in place using various known means. For example, the circuit boards may be provided with latches disposed on their respective edges, which engage with catches disposed on the walls of the cage.

In order to allow the circuit boards to be connected to the backplane, it is also typical to position the backplane at a rear of the cage, and in a vertical position. This allows the circuit boards to be plugged into the card slots of the backplane through the open front, for example, of the cage. However, due to the weight of the circuit boards, this arrangement may create a rotational force at the card slot of the backplane, stressing the respective connections. Moreover, vibrations or other environmental forces may cause the respective circuit boards to disengage with the associated card slots of the backplane, causing the circuit board to become non-functional. Thus, there is a need for an arrangement that will prevent or hinder the circuit boards from inadvertently disengaging with the backplane.

Further, it is often desirable to place various ones of the circuit boards, for example the memory riser cards, in different orientations within the cage. For example, in one configuration, respective first and second memory riser cards may be disposed immediately adjacent to the opposite faces of an input/output (i.o.) card, for example. However, the typical memory riser card is provided with a plurality of removable Dual In-Line Memory Modules (DIMMs), which can be inserted into electrical slots provided on a front surface of the card. Since the DIMMs project away from the front surface, the DIMMs prevent the front surface from being placed immediately adjacent to the respective face of the i.o. card. On the other hand, the rear surface of the memory riser card is usually free of such projecting components. By positioning the rear surface of the memory riser card adjacent to the face of the i.o. card, the memory riser card can be placed closer thereto, thus saving desirable space and increasing performance by reducing signal path lengths, for example.

As such, since the rear surface of the memory riser card is the preferred surface to be disposed adjacent to the i.o. card, it is conventional to arrange the first and second memory riser cards in orientations that are 180° opposite to each other. That is, one memory riser card must be rotated 180° relative to the other memory riser card, so that the rear surfaces of the respective memory riser cards face each other, for example, and face the adjacent i.o. card.

However, in the conventional arrangements, if the same type of memory riser card is used for both orientations, the plugs on the memory riser cards, and the card slots in the backplane must be symmetrically configured. That is, the card slots must be centered from the front of the cage to the back of the cage. This would allow the same type of memory riser card to be used regardless of the required orientation of the card.

However, due to wiring arrangements on the backplane, for example, it may not always be possible to symmetrically locate the card slots for the memory riser cards. Thus, it also known to provide so-called right- and left-hand memory riser cards. These cards have their card plugs offset between a front edge and a rear edge of the card, to match an offset of the card slots in the backplane. For example, the right-hand card has the card plug offset toward a front of the card, and the left-hand card has its card plug offset toward a rear thereof. Thus, the right-hand memory riser card can be utilized on a right-hand side of the i.o. card, for example, and the left-hand card can be used on the left-hand side of the i.o. card.

As will be appreciated, by requiring two different types of memory riser cards, the total number of different parts that need to be manufactured is increased, thus increasing tooling times and costs, and increasing inventory. Thus, there is a need for an arrangement that will allow the same type of circuit board, for example a memory riser card, to be utilized in either a left-hand or a right-hand orientation, with a backplane that has offset card slots.

Additionally, the cage is typically fixed within a so-called system chassis, which is a frame that provides further support for the cage, and which is removably stacked upon other system chassises within a system rack. The chassis may contain other components and sub-systems, such as power supplies and cooling fans, for example, which are connected to the components within the cage using cables, for instance.

When the cage is removed from the chassis for service, typically the connections between the cage components and the other components within the system chassis must be manually disconnected and reconnected. This is a relatively time consuming process. Thus, there is a need for an arrangement that will allow for the removal of the cage for servicing, for example, which does not require manually connecting and disconnecting various electrical connectors.

Further, typically the circuit boards have an elongated, rectangular configuration, with a height (from a top edge of the board to a bottom edge of the board) that is greater than their depth (from a rear edge of the board to a front (card slot) edge of the board). In order to accommodate the circuit boards, the cage has a height (i.e., the direction in which the circuit boards longitudinally extend) that is dictated by the height of the circuit boards. Thus, the cage typically has a height that is greater than its depth. This likewise requires that the system chassis have a height that is sufficient to accommodate the cage. However, the system rack usually determines the overall height of the computer. Since it is also typical to stack the system chassises on top of each other, the system rack can thus only accommodate therein a set number of system chassises. Thus, there is a need for an arrangement that will accommodate an increased number of system chassises without increasing a height of the system rack.

The system chassis typically has an opening that allows access into an interior thereof. The opening is conventionally positioned at a top of the chassis, within a horizontal plane. However, and as previously mentioned, since it is also typical to stack the system chassises on top of each other, the opening may be inaccessible. Thus, when a component within the system chassis needs to be accessed, for repair or upgrading, for example, the chassis is conventionally removed from the system rack. This removal process is time consuming.

Moreover, because the system chassis must be removable, the chassis may not be as rigidly connected to the system rack as may otherwise be desired. Thus, the components within the chassis may be subjected to undesirable shocks and vibrations. Thus, there is a need for an arrangement that allows access to all of the components contained within a chassis, while the chassis remains fixed within the system rack.

Additionally, it is also typical to arrange a removable EMC shield between a periphery of the cage and the inner walls of the system chassis. The EMC shield protects against electromagnetic interference, and allows static charges to be drained to the system ground during the installation and removal of the processor cards, i.o. cards and memory riser cards.

In order to access the circuit boards within the cage, it is conventional to remove the shield. However, this disadvantageously increases the number of loose parts during servicing of the cage components. Moreover, since the shield must be realigned relative to the cage and the system chassis, installation times are increased. Thus, there is a need for an arrangement that allows the cage to be accessed without separately removing the EMC shield.

SUMMARY OF THE INVENTION

It is, therefore, a principle object of this invention to provide an enhanced enclosure arrangement for a computer.

It is another object of the invention to provide an enhanced enclosure arrangement for a computer that solves the above mentioned problems.

These and other objects of the present invention are accomplished by the enhanced enclosure arrangement for a computer disclosed herein.

According to one aspect of the invention, a cage is provided that has side walls that have a height (i.e., a distance from a bottom of the cage to a top of the cage) that is greater than their respective lengths (i.e., a distance from the front wall to the rear wall). Further, the cage is dimensioned to accommodate a backplane, a memory riser card, an i.o. card and a processor card. When received within the cage, the backplane closes off an open bottom of the cage, and serves as a floor of the cage, with the printed circuit board of the backplane facing into the cage.

The memory riser card and the i.o. card are likewise generally planar, rectangular structures, with lengths that are greater than their heights. As previously mentioned, the cage can then be advantageously tailored in the same manner (with a length that is greater than its height), so as to receive the respective cards therein with a minimum of wasted space. This advantageously allows more cages to be disposed in the same amount of space in a vertical direction than could otherwise be accomplished using the conventional cages.

The memory riser card and the i.o. card are preferably removably coupled to the backplane by inserting a known corresponding plug connector on the respective card into an associated backplane card slot. As will be appreciated, since the cage is open at its top, the cards are inserted through the open top and moved in a vertical direction until the cards engage with the associated card slots. This configuration advantageously uses gravity to help hold the cards in position. That is, the weight of the respective cards urges the cards in a direction toward the backplane. Thus, the memory riser card and the i.o. card are less likely to inadvertently disengage with the backplane.

In a further exemplary embodiment of the present invention, one or more of the card slots of the backplane may be offset relative to the front and rear walls. For example, the card slots for the memory riser cards may be positioned closer to the rear wall of the cage than to the front wall, in order to reduce the wiring lengths to an associated port disposed in the tailstock, or for other wiring reasons.

In order to eliminate the need for different right-hand and left-hand memory riser cards, a spacer is advantageously provided on either the front wall or the rear wall of the cage, to which the memory riser card can be attached. That is, the spacer is located against the respective wall that is furthest away from the respective offset card slot, so as to cause the card slot to be symmetrically arranged (i.e., centered) between the spacer and the other wall. Thus, this exemplary embodiment allows the same type of memory riser card, for example, to be utilized in either a left-hand or a right-hand orientation, with a backplane that has offset card slots.

Since the cards may be modified by the user, in a further advantageous exemplary embodiment of the present invention, the cards are easily accessible within the cage. As previously discussed, the cards are accessed through the open top of the cage. Further, the chassis has a space in which the cage can be disposed, and has an open rear through which the cage may be accessed. The cage may be removed from the chassis through the open rear without removing the chassis from a rack. This advantageously allows the chassis to be permanently affixed within the rack, and ensures that the components disposed within the chassis will not be subjected to undesirable shocks and vibrations.

In order to facilitate the removal of the cage from the chassis, the cage is advantageously disposed on sliding rails that are connected to the chassis, for example. Thus, when it is desired to access the components disposed within the cage, the cage is simply slid in a horizontal direction out of the chassis.

In a further exemplary embodiment of the invention, and in order to reduce electromagnetic emissions, an electromagnetic shield is preferably permanently mounted to a rear of the cage. The electromagnetic shield advantageously automatically engages with the chassis, when the cage is disposed within the chassis, and automatically disengages with the chassis when the cage is removed from the interior thereof.

In another exemplary aspect of the present invention, and to facilitate the electrical connections between the components of the cage and those disposed within the chassis, the cage and chassis are provided with an autodocking feature that automatically couples the backplane, for example, with the components within the chassis. In this exemplary embodiment, the autodocking feature includes one or more plugs, for example, disposed within or on the cage and coupled to the backplane. The plugs are positioned against the outside surface of the front wall of the cage and/or positioned within the cage and adjacent to an opening formed through the front wall of the cage. Moreover, one or more receptacles can be provided within the chassis. When the cage is fully received within the chassis, the receptacles engage with the respective plugs, thereby automatically electrically coupling the backplane with other components disposed within the chassis. Likewise, when the cage is slid out of the chassis, the plugs automatically disengage with the respective receptacles, thereby uncoupling the backplane from the other components disposed within the chassis. This arrangement advantageously eliminates the need to manually disconnect various electrical connections between the cage and the chassis, when the cage is removed.

Furthermore, the sliding rails ensure that the cage is properly positioned and automatically aligned relative to the chassis during the autodocking procedure. Thus, the respective electrical connections can be coupled together automatically, reliably, and quickly.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper", "lower", "front", "back", "over", "under", and similar such terms are not to be construed as limiting the invention to a particular orientation. Instead, these terms are used only on a relative basis.

Figure 1:
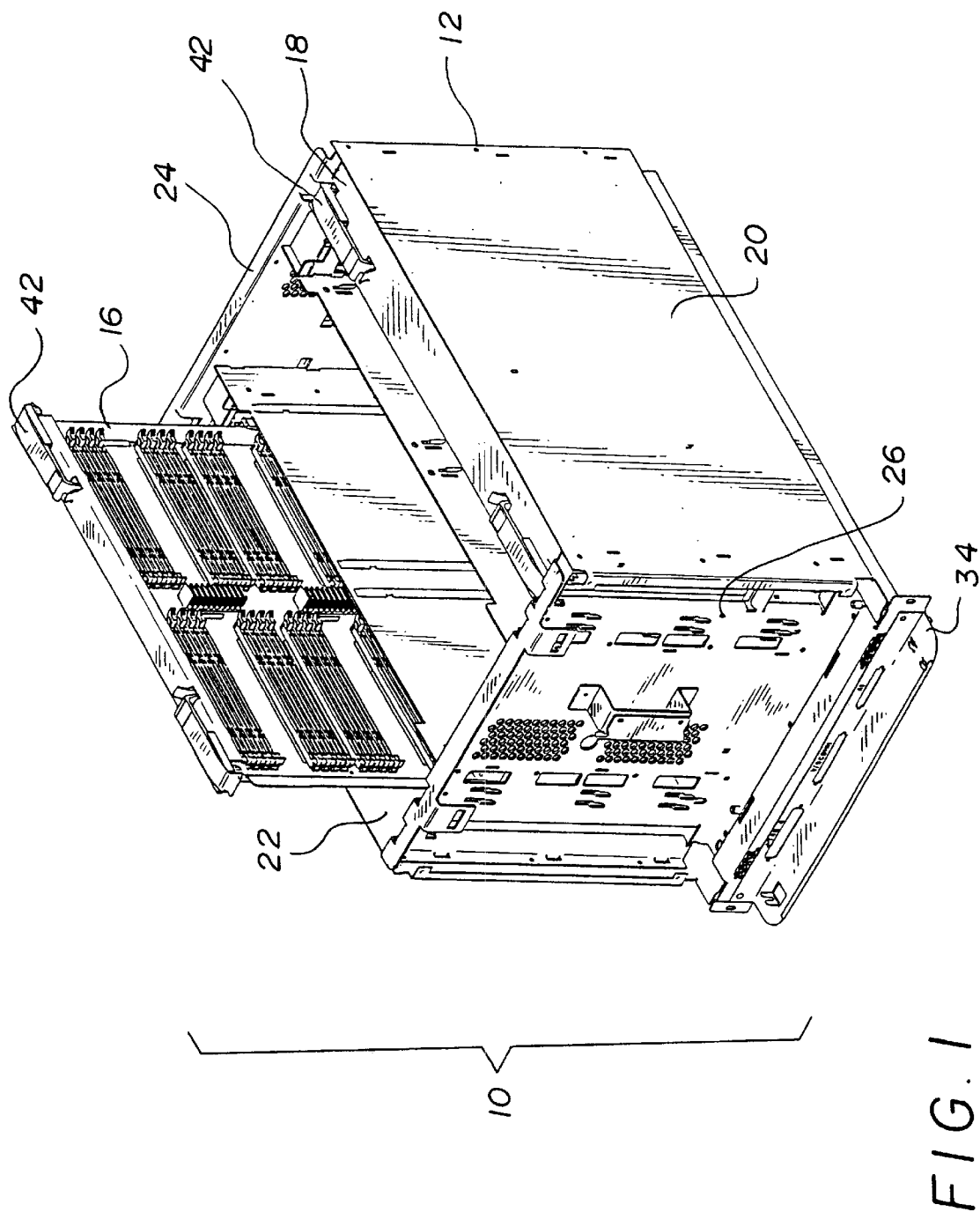
FIG. 1 is a perspective, exploded illustration of a central electronics complex, according to an exemplary embodiment of the invention.
Figure 2:
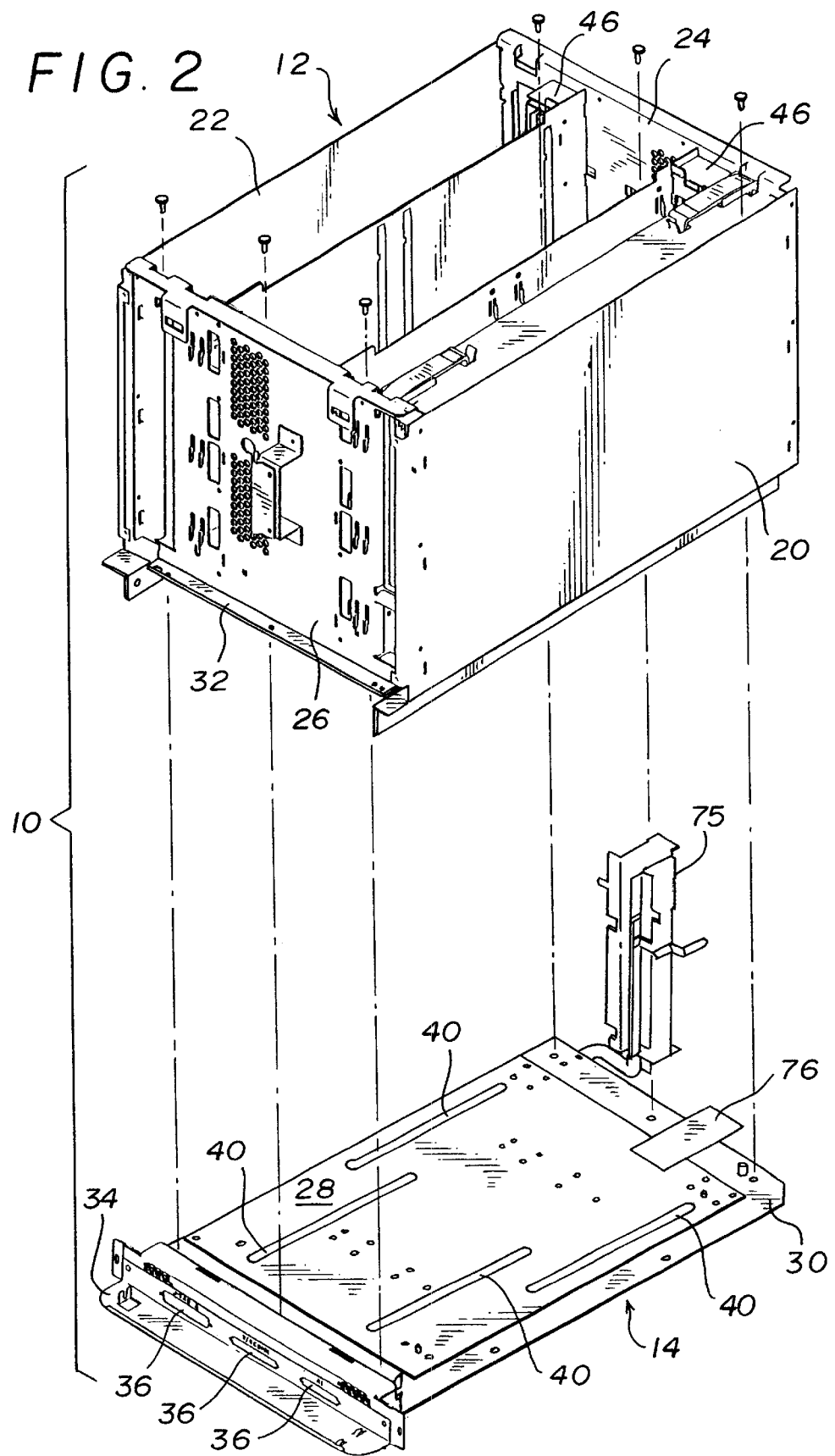
FIG. 2 is an exploded view of portions of the central electronics complex shown in FIG. 1.

FIGS. 1 and 2 illustrate an exemplary embodiment of the invention, which includes a so-called central electronics complex 10 (CEC) of a computer system. The CEC 10 is comprised of an enclosure (such as a cage 12), a backplane 14 (FIG. 2), and a plurality of circuit boards, such as a memory riser card 16 and an input/output (i.o.) card 18 (FIG. 1), attachable to the backplane 14.

As shown, the cage 12 has a box shape with a generally rectangular cross-sectional profile, and is formed of two, generally upright, spaced apart side walls 20, 22 joined together by generally upright, spaced apart front and rear walls 24, 26. The walls 20, 22, 24, 26 define a space within the cage 12, which can be accessed through a top opening in the cage. Moreover, for reasons that will be more fully explained in the passages that follow, the side walls 20, 22 have a height (i.e., a distance from a bottom of the cage 12 to a top of the cage) that is less than their respective lengths (i.e., a distance from the front wall 24 to the rear wall 26).

The cage 12 is dimensioned to accommodate the backplane 14, memory riser card 16 and I.O. card 18, as will be subsequently described. Moreover, the cage 12 is preferably comprised of sheet metal, which can be easily manipulated to form the walls 20, 22, 24, 26, although other materials, such as plastic, may also be used. However, it is preferable that the material used to form the cage 12 be conductive, so that the cage can serve as an EMC shield.

As best shown in FIG. 2, the backplane 14 is a generally planar, rectangular structure, and is accommodated within the cage 12 so that its major surfaces are substantially horizontal and essentially perpendicular to the walls 20, 22, 24, 26 of the cage. Moreover, the backplane 14 is comprised, for example, of a printed circuit board 28 (PCB), and a stiffener panel 30 disposed beneath the printed circuit board 28. An insulator panel, not shown, may also be provided between the stiffener panel 30 and the printed circuit board 28.

The stiffener panel 30 is connectable to the cage 12, for example, by fastening the stiffener panel to flanges 32 disposed on a lower bottom edge of the front and rear walls 24, 26 (only the rear flange 32 is shown). For example, the stiffener panel 30 can be screwed, bolted or welded to the flanges 32. Other means for connecting the stiffener panel 30 to the cage 12 are within the scope of the present invention. When connected, the backplane 14 closes off the open bottom of the cage 12, and serves as a floor of the cage, with the printed circuit board 28 facing into the cage.

Preferably, a rear edge of the stiffener panel 30 has a tailstock 34 disposed thereon. As is known, a tailstock is a plate that provides physical support for the associated electrical device (for example, the backplane 14), and which may provide for a limited amount of electromagnetic radiation shielding in some situations.

The tailstock 34 is provided with a plurality of apertures 36, which form ports that allow various external peripherals to be connected to the backplane 14. For example, in the exemplary illustrated embodiment, the tailstock 34 is provided with three such ports. However, the number and size of the apertures 36 can be modified without departing from the spirit and scope of the present invention.

Figure 3:
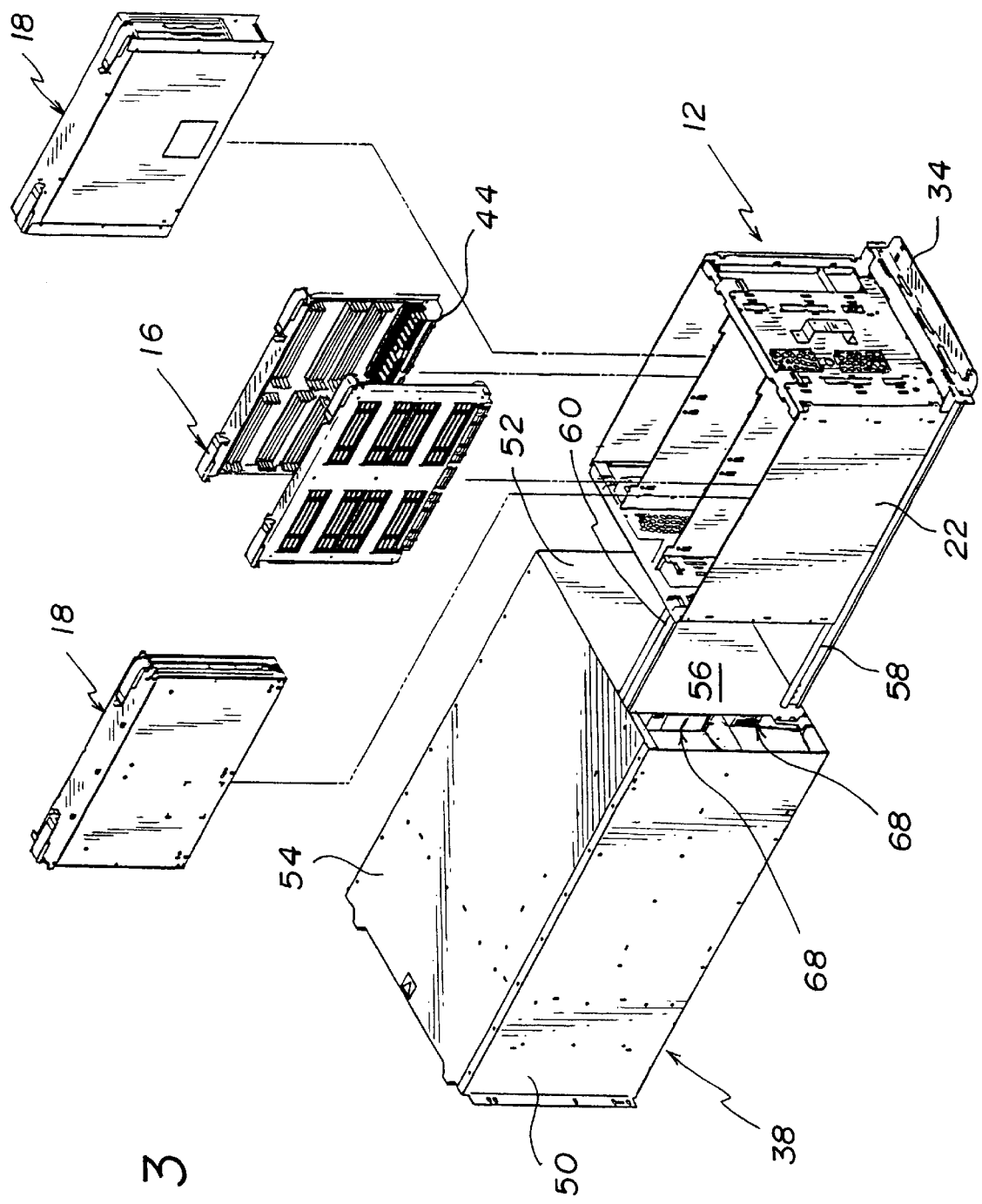
FIG. 3 is a perspective, exploded view of the central electronics complex shown in FIG. 1 and an associated chassis, according to the present invention.

The tailstock 34 is preferably tailored to allow it to be fastened to an associated chassis 38 (shown in FIG. 3). For example, in the illustrated exemplary embodiment, the tailstock 34 extends past the side walls 20, 22 of the cage 12. When the cage 12 is received within the chassis 38 (as will be more fully explained in the pages that follow), the portions of the tailstock 34 that extend past the side walls 20, 22 can be fastened to the chassis 38. This secures the cage 12 within the chassis 38, and prevents fretting of any electrical connections between the backplane 14, and other system components disposed within the chassis 38, for example. As is known, fretting is a phenomenon in which surface damage occurs when metal contacts are subjected to microvibrations.

The memory riser card 16 and the I.O. card 18 are likewise generally planar, rectangular structures, with lengths that are greater than their heights. As previously mentioned, the cage 12 can then be advantageously tailored in the same manner (with a length that is greater than its height), so as to receive the respective cards 16, 18 therein with a minimum amount of wasted space. This advantageously allows more cages to be disposed in the same amount of space in a vertical direction than could otherwise be accomplished using the conventional cages.

When installed in the cage 12, the cards 16, 18 are essentially parallel to the side walls 20, 22, of the cage 12, and essentially perpendicular to the front and rear walls 24, 26 of the cage and to the major surfaces of the backplane 14. However, other orientations may be possible, within the scope of the present invention.

The memory riser card 16 and the I.O. card 18 are preferably removably coupled to the backplane 14 by inserting a known corresponding plug connector (not shown in detail) on the respective card into an associated backplane card slot 40 (FIG. 2). As will be appreciated, since the cage 12 is open at its top, the cards 16, 18 are inserted through the open top and moved in a vertical direction until the cards engage with the associated card slots 40.

The cards 16, 18 are then held in place using various known means. For example, as best shown in FIG. 1, the memory riser card 16 and the I.O. card 18 may be provided with cam-action latches 42 disposed on their respective upper edges, which engage with catches disposed in or on the cage 12. The latches 42 provide leverage for plugging and unplugging the circuit boards 16, 18, to the backplane 14.

As will be appreciated, this configuration advantageously uses gravity to help retain the cards 16, 18 in position. That is, the weight of the respective cards 16, 18 urges the cards in a direction toward the backplane 14. Thus, the memory riser card 16 and the I.O. card 18 are less likely to inadvertently disengage with the backplane 14.

As illustrated in FIGS. 1 and 3, the backplane 14 is adapted to receive and electrically interconnect a plurality of memory riser cards 16, and a plurality of I.O. cards 18. For example, the illustrated backplane 14 is adapted to receive two memory riser cards 16, and two I.O. cards 18.

Figure 4:
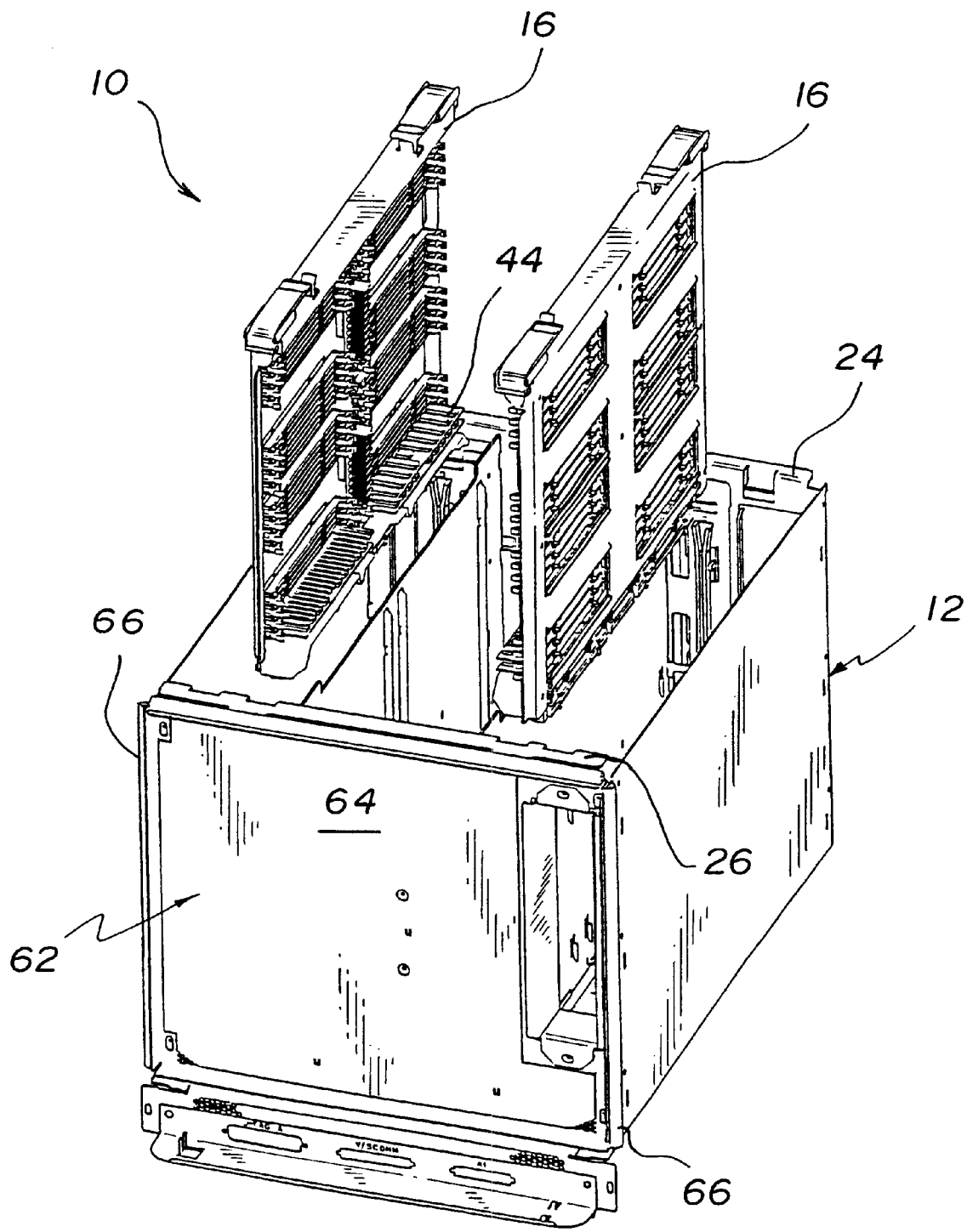
FIG. 4 is a further exploded view of portions of the central electronics complex shown in FIG. 1.

Further, and as illustrated best in FIG. 4, each memory riser card 16 can accommodate a plurality of electrical components, for example, a plurality of Dual In-Line Memory Modules 44 (DIMMs). The DIMMs 44 can be easily added to the memory riser card 16 as the computer memory needs of the user change. However, since the DIMMs 44 project away from the front surface of the memory riser cards 16, the DIMMs prevent the front surface from being placed immediately adjacent to the respective I.O. card 18.

In the illustrated exemplary embodiment, and as best shown in FIGS. 1 and 3, a respective I.O. card 18 is disposed adjacent to one of the side walls 20, 22 of the cage 12, and a memory riser card 16 is disposed immediately adjacent to a face of a respective I.O. card 18. Since the rear surface of the memory riser card 16 is usually free of projecting components, the rear surface of the memory riser card 16 is positioned adjacent to the face of the I.O. card 18. Thus, the memory riser card can be placed closer thereto, saving desirable space. As will be appreciated, the memory riser cards 16 of this exemplary arrangement are therefore positioned 180° relative to each other, so that the front surfaces of the respective memory riser cards face each other.

However, in a further exemplary embodiment of the present invention, one or more of the card slots 40 of the backplane 14 may be offset relative to the front and rear walls 24, 26. For example, and a best shown in FIG. 2, the card slots 40 for the memory riser cards 16 may be positioned closer to the rear wall 26 of the cage 12 than to the front wall 24, in order to reduce the wiring lengths to the associated port 36 disposed in the tailstock 34, or for other wiring reasons.

Figure 5:
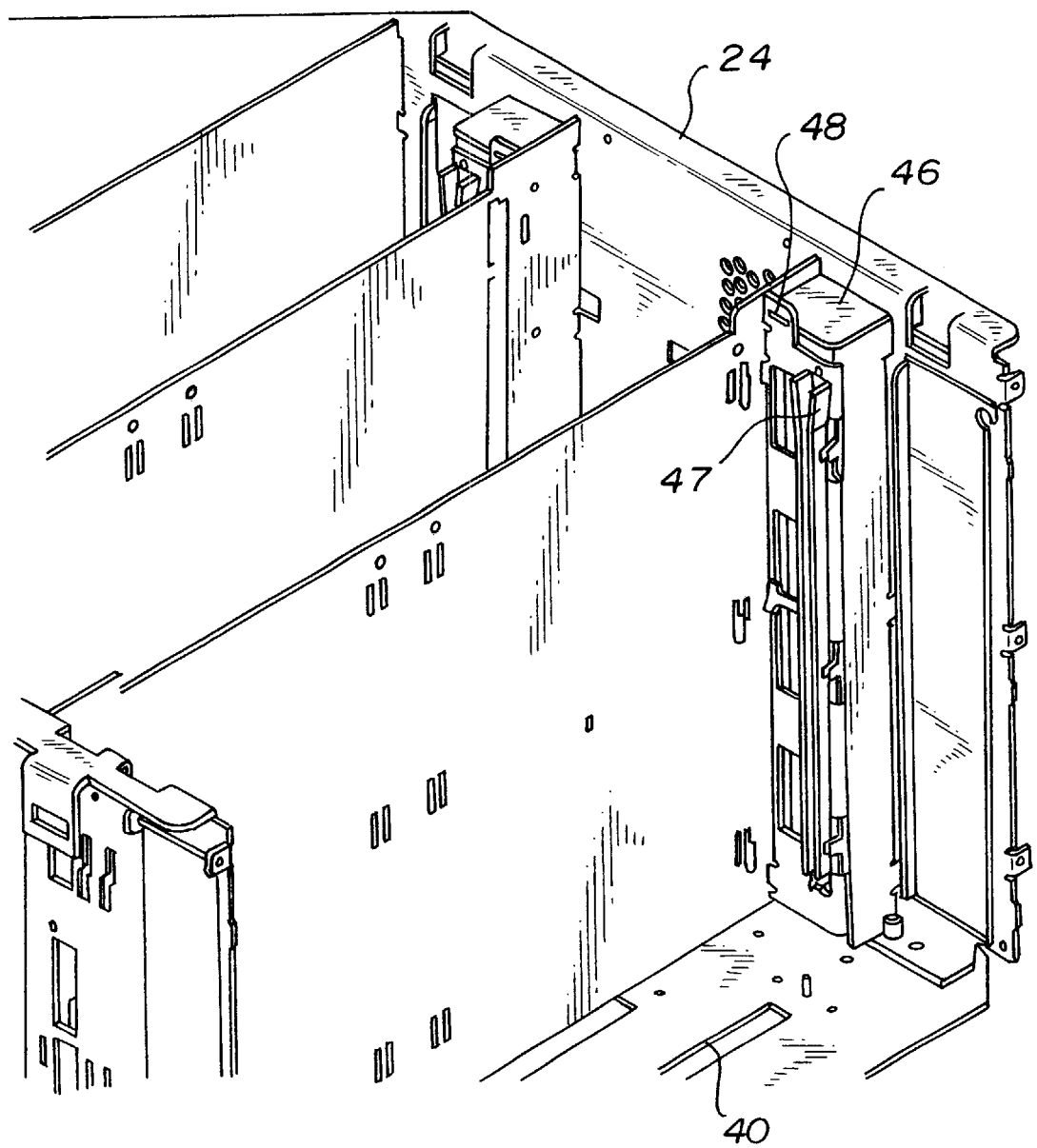
FIG. 5 is a partial illustration showing an interior of a cage of the central electronics complex shown in FIG. 1.

Referring also to FIG. 5, in order to eliminate the conventional need for different right-hand and left-hand memory riser cards, a spacer 46 is advantageously provided on either the front wall 24 or the rear wall 26 of the cage, to which the memory riser card can then be attached. That is, the spacer 46 is located against the respective wall 24, 26 that is furthest away from the respective offset card slot 40, so as to cause the card slot to be symmetrically arranged (i.e., centered) between the spacer 46 and the other wall 24 or 26. Thus, this exemplary embodiment allows the same type of memory riser card, for example, to be utilized in either a left-hand or a right-hand orientation, with a backplane that has offset card slots.

The spacer 46 is preferably formed from sheet metal, and has a rectangular configuration. Moreover, in order to accommodate the memory riser card 16, the configuration of a face of the spacer 46 is preferably similar to a configuration of the opposing front or rear wall 24, 26. That is, and assuming the spacer is disposed on the inside of the front wall 24, the rear wall 26 will be provided with a guide portion (not shown in detail) that engages with the edge of the card 16, and a catch on an upper edge thereof to which the latch 42 engages. Similarly, the spacer 46 is provided with a guide portion 47 and a catch 48. Thus, the rear wall 26 and the spacer 46 are both used to guide and hold the memory riser card 16 in position.

Although the present embodiment has been described in connection with memory riser cards, it is contemplated that the same inventive scheme can be utilized with other types of circuit boards. Moreover, it is also contemplated that the respective cards will be specifically tailored for use with the cage 12. For example, in the above-described exemplary embodiment, the plug connector of the memory riser card is disposed symmetrically, that is, in a center of the card.

As will be appreciated, since the cards 16,18 may be modified by the user, it is advantageous if the cards be easily accessible. As previously discussed, the cards 16, 18 are accessed through the open top of the cage 12. Conventionally, the cages are each positioned within a respective chassis, each having an open top, with the respective chassises and cages being stacked upon each other. As such, in order to access a cage within a lower positioned chassis, it had conventionally been necessary to remove the associated chassis from a rack.

According to a further exemplary embodiment of the present invention, and as best shown in FIG. 3, the chassis 38 has a box shape with a generally rectangular cross-sectional profile, and is formed of two, generally upright, spaced apart side walls 50, 52 joined together by generally horizontal, spaced apart roof member 54 and floor member 56. The walls 50, 52, roof member 54 and floor member 56 define a space within the chassis 38, which can be accessed through an open rear of the chassis, and in which the cage 12 can be disposed. The cage 12 may be removed from the chassis 38 through the open rear without removing the chassis from a rack, for example.

Figure 8:
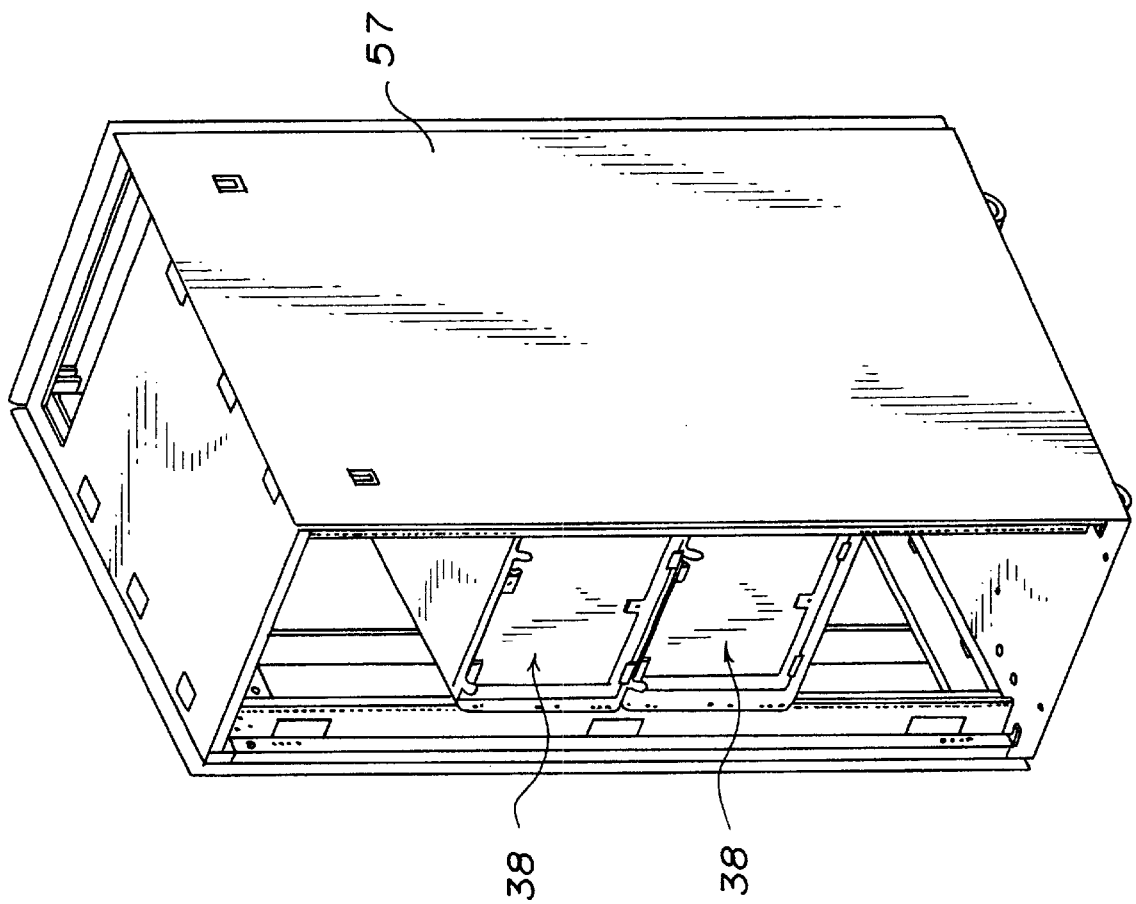
FIG. 8 is a perspective view of the chassis shown in FIG. 4 inserted into a rack.

Referring briefly to FIG. 8, preferably, the chassis 38 is permanently affixed within a rack 57. For example, the chassis 38 can be welded or fastened to the rack 57 using mechanical fasteners. This advantageously ensures that the components disposed within the chassis 38 will not be subjected to undesirable shocks and vibrations.

As best shown in FIG. 3, in order to facilitate the removal of the cage 12 from the chassis 38, the cage is advantageously disposed on sliding rails 58 which are connected to the chassis 38, for example. Thus, when it is desired to access the components disposed within the cage 12, the cage is simply slid in a horizontal direction out of the chassis 38.

Preferably, there are two parallel sliding rails 58, with one of the sliding rails being disposed under one of the side walls 20 of the cage 12, and the other one of the sliding rails being disposed under the other one of the side walls 22. The cage 12 is connected to the sliding rails 58 using screws, for example, although other means of fastening the cage to the sliding rails are within the scope of the present invention.

Further, in the exemplary illustrated embodiment, the chassis 38 is provided with guide rails 60, with each sliding rail 58 being slidingly engaged with a respective guide rail 60. In one embodiment, the guide rails 60 are fastened to the opposite inner vertical surfaces of chassis 38. Variations in the placement and number of the sliding rails 58 and guide rails 60 are within the scope of the present invention.

Referring back to FIG. 4, in order to reduce electromagnetic emissions, an electromagnetic shield 62 is preferably permanently mounted to a rear of the cage 12. The electromagnetic shield 62 advantageously automatically engages with the chassis (not shown in this Figure), when the cage 12 is disposed within the chassis, and automatically disengages with the chassis when the cage is removed from the interior thereof.

In the illustrated exemplary embodiment, the electromagnetic shield 62 includes a conductive plate member 64 that is connected to the rear wall 26 of the cage 12. The plate member 64 is sized to nest within the opening in the rear of the chassis 38. In order to fill any gaps between the edges of the plate member 64 and the inner surfaces of the chassis 38, a flexible conductive gasket 66 is provided on an outer periphery of the plate member. The gasket 66 may be glued to the plate member 64, for example, or fastened thereto using other means. The gasket 66 engages with the chassis 38 when the cage 12 is disposed therein, thereby grounding the plate member 64 to the chassis 38.

Figure 6:
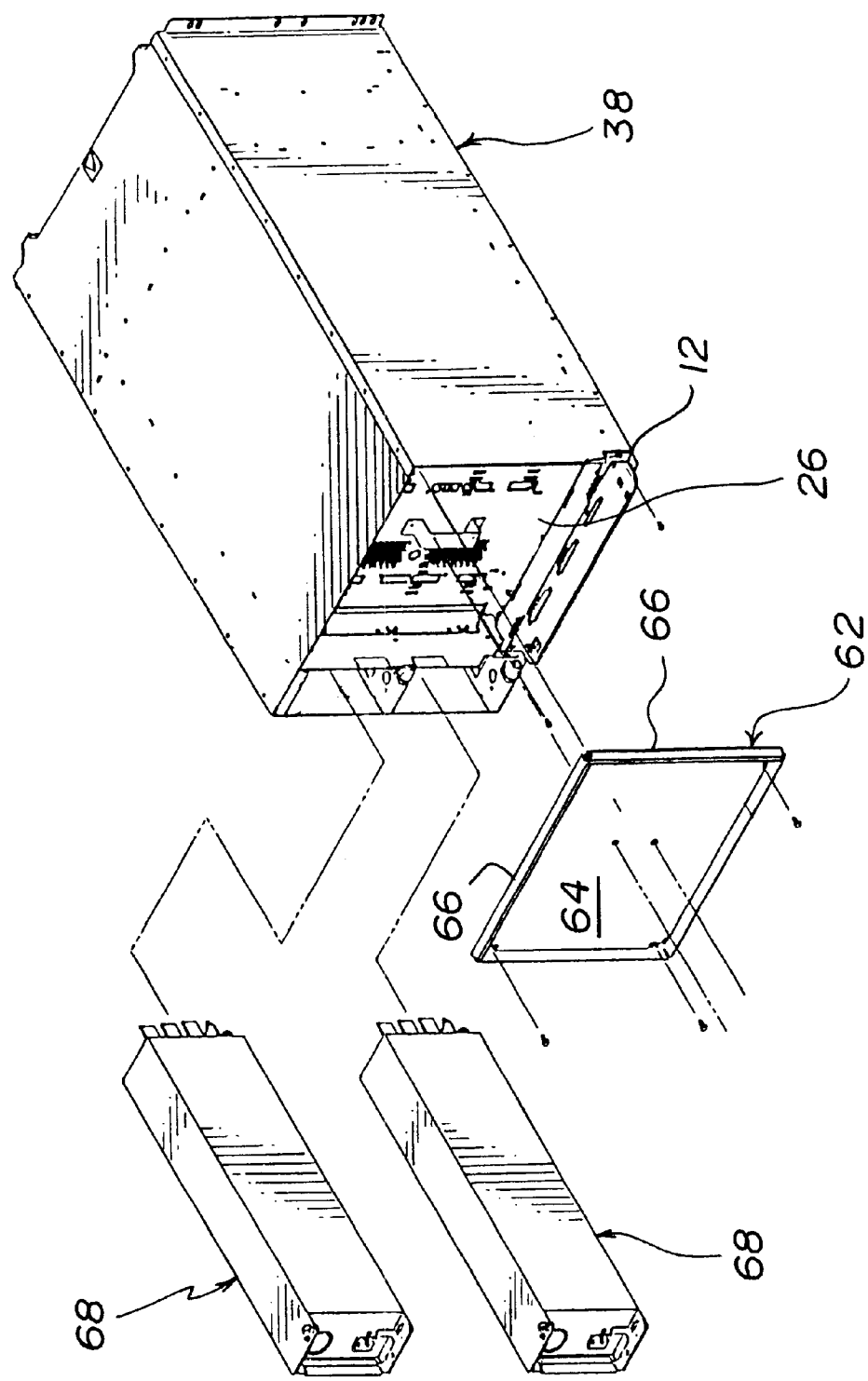
FIG. 6 is a rear exploded view of the chassis shown in FIG. 3, having therein the central electronics complex shown in FIG. 1.
Figure 7:
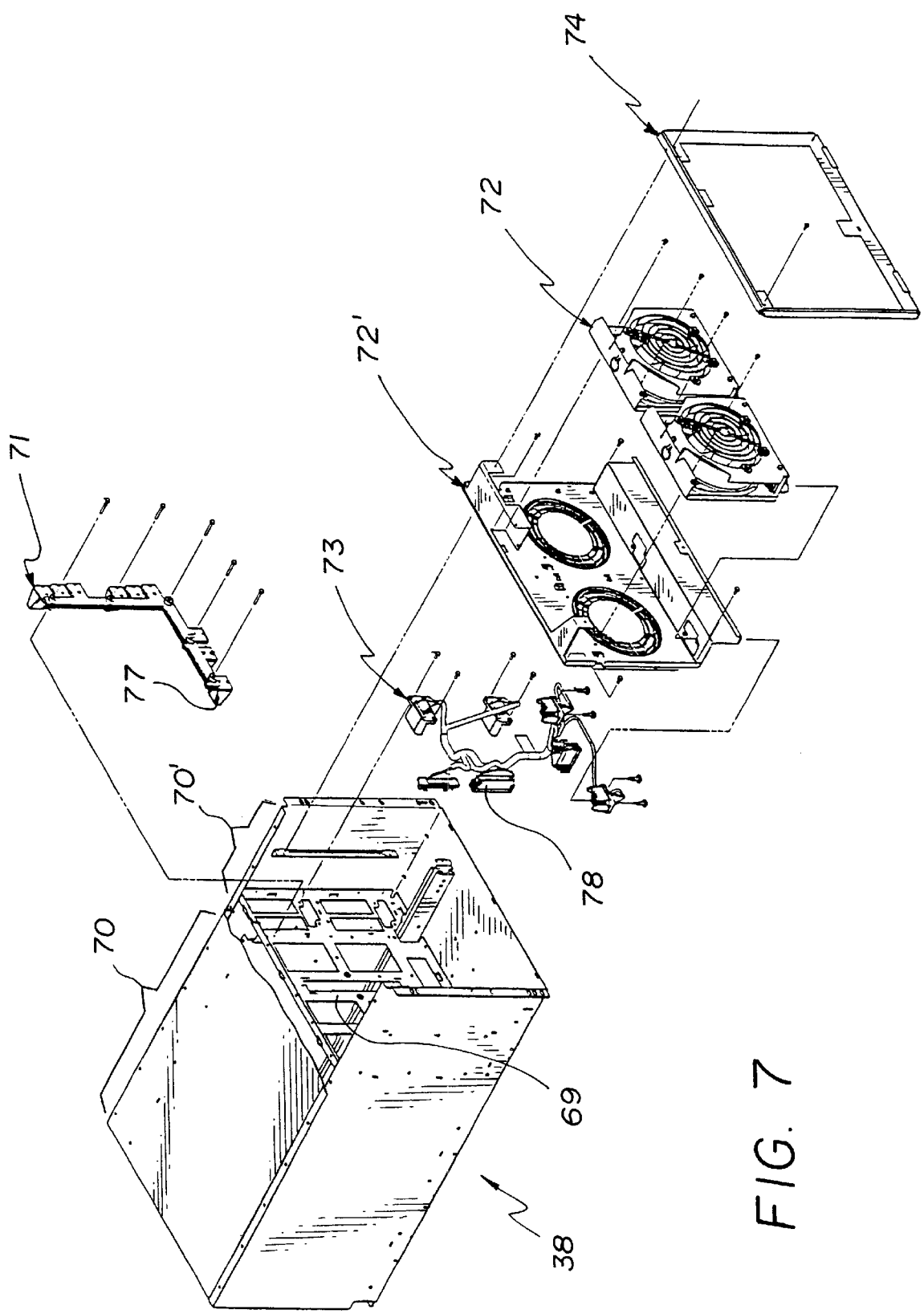
FIG. 7 is a front exploded view of the chassis shown in FIG. 4.

In the illustrated exemplary embodiment, and as best shown in FIGS. 3 and 6, the chassis 38 has one or more power supplies 68 disposed therein, for example against one of the chassis side walls 50, 52, and in a space provided adjacent to the cage 12. Moreover, and as best shown in FIG. 7, the chassis 38 is separated using a plate 69 into a rear region 70, in which the cage 12 and power supplies 68 are disposed, and a front region 70'. The front region 70' of the chassis 38 may be provided with a buss bar 71, cooling fans 72 and a cooling fan mount 72', a cable connection 73 for coupling the power supply, buss bar, and the fans together, and any other desired components. The front region 70' may also be provided with a cover 74 to seal the various components 71, 72, 72', 73 within the chassis 38. Cover 74 may be comprised of a conductive material to function as an EMC shield. These various components remain within the chassis 38 regardless of whether the cage 12 is disposed within the cage, or slid out of the chassis.

Preferably, in order to facilitate the electrical connections between the components of the cage 12 and those disposed within the chassis 38, the cage and chassis are provided with an autodocking feature that automatically couples the backplane 14, for example, with the components 71, 72, 73 within the chassis. In the illustrated exemplary embodiment, the autodocking feature includes at least plug 75 and/or 76 (shown only in FIG. 2) disposed within and/or on the cage 12 and, for example, coupled to the backplane 14. The plug 75 is positioned against the outside surface of the front wall 24 of the cage 12, and the plug 76 is positioned adjacent to an opening (not shown in detail) formed through the front wall 24 of the cage 12. Moreover, the buss bar 71 is fastened to the plate 69, and includes one or more projecting receptacles 77 that are positioned in registration with an opening formed in the plate 69. The projecting receptacles 77 are arranged in registration with respective ones of the plugs 76. Further, the cable connection 73 includes a receptacle 78 positioned within a further opening in the plate 69.

When the cage 12 is fully received within the chassis 38, the projecting receptacles 77 engage with the respective plugs 76, and/or the receptacle 78 of the cable connection 73 engages with a respective plug 75, thereby coupling the backplane 14 with the other components 68, 72 disposed within the chassis 38. Likewise, when the cage 12 is slid out of the chassis 38, the projecting receptacles 77 automatically disengage with the respective plugs 76, and/or the receptacle 78 of the cable connection 73 automatically disengages with the respective plug 75, thereby electrically uncoupling the backplane 14 from the other components 68, 72 disposed within the chassis 38. This arrangement advantageously eliminates the need to manually disconnect various electrical connections between the cage and the chassis, when the cage is removed. Of course, it is contemplated that the backplane can be coupled to the other components in the chassis using other arrangements, without departing from the spirit of the invention.

Furthermore, the sliding rails 58 ensure that the cage 12 is properly positioned and automatically aligned relative to the chassis 38 during the autodocking procedure. Thus, the respective electrical connections can be coupled together automatically, reliably, and quickly.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. An enclosure arrangement, comprising:
   a cage;
   a chassis, said cage being removably positioned within said chassis;
   at least one rail connecting said cage to said chassis, said cage being disposed on said rail, and being guidable into said chassis using said rail;
   wherein said at least one rail includes at least one guide rail affixed to said chassis, and at least one sliding rail affixed to said cage, said sliding rail being slidably received by said guide rail to allow said cage to be slid into and out of said chassis; and a plug disposed on one of said chassis and said cage, and a receptacle disposed on the other one of said chassis and said cage, wherein said guide rail and said sliding rail align said receptacle relative to said plug, and guide one of said receptacle and said plug into the other one of said receptacle and said plug when said cage is slid into said chassis.

2. The enclosure arrangement of claim 1, wherein said at least one guide rail includes two guide rails, each being disposed within said chassis and on opposite sides of said chassis, and wherein said at least one sliding rail includes two sliding rails, each being disposed on an outside of said cage, and on opposite sides of said cage.

3. An enclosure arrangement, comprising:

a cage;

a chassis, said cage being removably positioned within said chassis;

at least one rail connecting said cage to said chassis, said cage being disposed on said rail, and being guidable into said chassis using said rail;

wherein said at least one rail includes at least one guide rail affixed to said chassis, and at least one sliding rail affixed to said cage, said sliding rail being slidably received by said guide rail to allow said cage to be slid into and out of said chassis;

wherein said chassis has an open rear, and wherein said cage is slid essentially in a horizontal direction into and out of said chassis through the open rear;

wherein said cage has an open top, and wherein an interior of said cage is accessible through the open top when said cage is slid out of said chassis;

a backplane arranged in a horizontal position, and forming a floor of said cage, said backplane having at least one card slot on a surface thereof;

at least one circuit board disposed in the interior of said cage and being removably received by said card slot, said circuit board being arranged in a vertical position so that a gravitational force helps retain said circuit board in said card slot;

wherein said at least one card slot is offset on said backplane toward one of a front wall and a rear wall of said cage; and a spacer positioned on the other one of the front wall and the rear wall of said cage and in alignment with said card slot, whereby the card slot is symmetrically positioned between said spacer and said one of the front wall and the rear wall of said cage.

4. An enclosure arrangement, comprising:

a cage;

a chassis, said cage being removably positioned within said chassis;

at least one rail connecting said cage to said chassis, said cage being disposed on said rail, and being guidable into said chassis using said rail;

wherein said at least one rail includes at least one guide rail affixed to said chassis, and at least one sliding rail affixed to said cage, said sliding rail being slidably received by said guide rail to allow said cage to be slid into and out of said chassis;

wherein said cage has a front wall, and a rear wall spaced away from said front wall, and wherein when said cage is slid into said chassis, said front wall enters said chassis before said rear wall; and an EMC shield permanently affixed to said cage in a region of said rear wall, said EMC shield engaging with said chassis when said cage is slid into said chassis, and disengaging with said chassis when said cage is slid out of said chassis.

5. The enclosure arrangement of claim 4, further comprising a plug disposed on one of said chassis and said cage, and a receptacle disposed on the other one of said chassis and said cage, wherein said guide rail and said sliding rail align said receptacle relative to said plug, and guide one of said receptacle and said plug into the other one of said receptacle and said plug when said cage is slid into said chassis.

6. The enclosure arrangement of claim 4, wherein said chassis has an open rear, and wherein said cage is slid essentially in a horizontal direction into and out of said chassis through the open rear.

7. The enclosure arrangement of claim 6, wherein said chassis comprises a first chassis; further comprising a second chassis stacked upon said first chassis, said first chassis and said second chassis maintaining a stacked relationship relative to each other when said cage is slid out of said first chassis.

8. The enclosure arrangement of claim 7, further comprising a rack having said first chassis and said second chassis permanently connected thereto.

9. The enclosure arrangement of claim 6, wherein said cage has an open top, and wherein an interior of said cage is accessible through the open top when said cage is slid out of said chassis.

10. The enclosure arrangement of claim 9, further comprising a backplane arranged in a horizontal position, and forming a floor of said cage, said backplane having at least one card slot on a surface thereof; and at least one circuit board disposed in the interior of said cage and being removably received by said card slot, said circuit board being arranged in a vertical position so that a gravitational force helps retain said circuit board in said card slot.

11. The enclosure arrangement of claim 4, wherein said EMC shield includes a conductive plate member disposed parallel to said rear wall, and a conductive flexible gasket disposed at least partially around a periphery of said plate member, said conductive flexible gasket engaging with said chassis when said cage is slid into said chassis.

12. A central electronics complex of a computer system, comprising:

a cage having two spaced apart side walls, a front wall and a rear wall, said side walls, front wall and rear wall being connected together to define an interior of said cage, said cage having an open top providing access into the interior of said cage;

a backplane arranged in a horizontal position, and forming a floor of said cage, said backplane having at least one card slot on a surface thereof;

at least one circuit board disposed in the interior of said cage and being removably received by said card slot, said circuit board being arranged in a vertical position so that a gravitational force helps retain said circuit board in said card slot;

wherein said at least one card slot is offset on said backplane toward one of the front wall and the rear wall of said cage; and a spacer positioned on the other one of the front wall and the rear wall of said cage and in alignment with said card slot, whereby the card slot is symmetrically positioned between said spacer and said one of the front wall and the rear wall of said cage.

13. The central electronics complex of claim 12, wherein said at least one circuit board comprises a memory riser card, said memory riser card engaging with said spacer and said one of the front wall and the rear wall of said cage when received in the card slot.

14. The central electronics complex of claim 13, wherein said memory riser card can selectively be in either a first position when received in the card slot, or rotated 180° into a second position when received in the card slot.

15. A central electronics complex of a computer system, comprising:
- a cage having two spaced apart side walls, a front wall and a rear wall, said side walls, front wall and rear wall being connected together to define an interior of said cage, said cage having an open top providing access into the interior of said cage;
- a backplane arranged in a horizontal position, and forming a floor of said cage, said backplane having at least one card slot on a surface thereof;
- at least one circuit board disposed in the interior of said cage and being removably received by said card slot, said circuit board being arranged in a vertical position so that a gravitational force helps retain said circuit board in said card slot; and
- an EMC shield permanently affixed to said cage in a region of said rear wall.

16. The central electronics complex of claim 15, wherein said at least one circuit board comprises at least one of a memory riser card and an input-output card.

17. The central electronics complex of claim 15, wherein said cage has a height that is less than a distance from said front wall to said rear wall.

18. The central electronics complex of claim 15, wherein said EMC shield includes a conductive plate member disposed parallel to said rear wall, and a conductive flexible gasket disposed at least partially around a periphery of said plate member.

19. A computer, comprising:
- a rack;
- a first chassis positioned within said rack, and having an open rear;
- a central electronics complex, including:
  - a cage removably positioned within said first chassis, and having two spaced apart side walls, a front wall and a rear wall, said side walls, front wall and rear wall being connected together to define an interior of said cage, said cage having an open top providing access into the interior of said cage;
  - a backplane arranged in a horizontal position, and forming a floor of said cage, said backplane having at least one card slot on a surface thereof; and
  - at least one circuit board disposed in the interior of said cage and being removably received by said card slot, said circuit board being arranged in a vertical position so that a gravitational force helps retain said circuit board in said card slot;
- at least one rail connecting said cage to said first chassis, said cage being disposed on said rail, and being slidable in a horizontal direction into and out of said first chassis through the open rear using said rail, the interior of said cage being accessible through the open top when said cage is slid out of said first chassis;
- a second chassis stacked upon said first chassis, said first chassis and said second chassis maintaining a stacked relationship relative to each other when said cage is slid out of said first chassis;
- wherein said at least one rail includes at least two guide rails affixed to said first chassis, and at least two sliding rails affixed to said cage, said sliding rails being slidably received by said guide rails to allow said cage to be slid into and out of said first chassis; and
- a plug disposed on one of said first chassis and said cage, and a receptacle disposed on the other one of said first chassis and said cage, wherein said guide rails and said sliding rails align said receptacle relative to said plug, and guide one of said receptacle and said plug into the other one of said receptacle and said plug when said cage is slid into said first chassis.

20. The computer of claim 19, wherein said first chassis and said second chassis are permanently connected to said rack.

21. The computer of claim 19, wherein said first chassis has a power supply, a fan, and a buss bar disposed therein, at least one of said power supply, said fan and said buss bar being electrically coupled with said backplane via said plug and said receptacle when said cage is slid into said first chassis, and being electrically uncoupled from said backplane when said cage is slid out of said first chassis.

22. The computer of claim 19, wherein when said cage is slid into said first chassis, said front wall enters said first chassis before said rear wall; further comprising an EMC shield permanently affixed to said cage in a region of said rear wall, said EMC shield engaging with said first chassis when said cage is slid into said first chassis, and disengaging with said first chassis when said cage is slid out of said first chassis.

23. The computer of claim 22, wherein said EMC shield includes a conductive plate member disposed parallel to said rear wall, and a conductive flexible gasket disposed at least partially around a periphery of said plate member, said conductive flexible gasket engaging with said first chassis when said cage is slid into said chassis.

24. The computer of claim 19, wherein said cage has a height that is less than a distance from said front wall to said rear wall.

25. A computer, comprising:
- a rack;
- a first chassis positioned within said rack, and having an open rear;
- a central electronics complex, including:
  - a cage removably positioned within said first chassis, and having two spaced apart side walls, a front wall and a rear wall, said side walls, front wall and rear wall being connected together to define an interior of said cage, said cage having an open top providing access into the interior of said cage;
  - a backplane arranged in a horizontal position, and forming a floor of said cage, said backplane having at least one card slot on a surface thereof; and
  - at least one circuit board disposed in the interior of said cage and being removably received by said card slot, said circuit board being arranged in a vertical position so that a gravitational force helps retain said circuit board in said card slot;
- at least one rail connecting said cage to said first chassis, said cage being disposed on said rail, and being slidable in a horizontal direction into and out of said first chassis through the open rear using said rail, the interior of said cage being accessible through the open top when said cage is slid out of said first chassis; and
- a second chassis stacked upon said first chassis, said first chassis and said second chassis maintaining a stacked relationship relative to each other when said cage is slid out of said first chassis;

wherein said at least one card slot is offset on said backplane toward one of the front wall and the rear wall of said cage; and wherein said central electronics complex further comprises a spacer positioned on the other one of the front wall and the rear wall of said cage and in alignment with said card slot, whereby the card slot is symmetrically positioned between said spacer and said one of the front wall and the rear wall of said cage.

26. The computer of claim 25, wherein said at least one rail includes at least two guide rails affixed to said first chassis, and at least two sliding rails affixed to said cage, said sliding rails being slidably received by said guide rails to allow said cage to be slid into and out of said first chassis.

27. The computer of claim 26, further comprising a plug disposed on one of said first chassis and said cage, and a receptacle disposed on the other one of said first chassis and said cage, wherein said guide rails and said sliding rails align said receptacle relative to said plug, and guide one of said receptacle and said plug into the other one of said receptacle and said plug when said cage is slid into said first chassis.

28. The computer of claim 25, wherein said at least one circuit board comprises a memory riser card, said memory riser card engaging with said spacer and said one of the front wall and the rear wall of said cage when received in the card slot.

29. The computer of claim 28, wherein said memory riser card can selectively be in either a first position when received in the card slot, or rotated 180° into a second position when received in the card slot.

* * * * *